United States Patent Office 3,190,074
Patented June 22, 1965

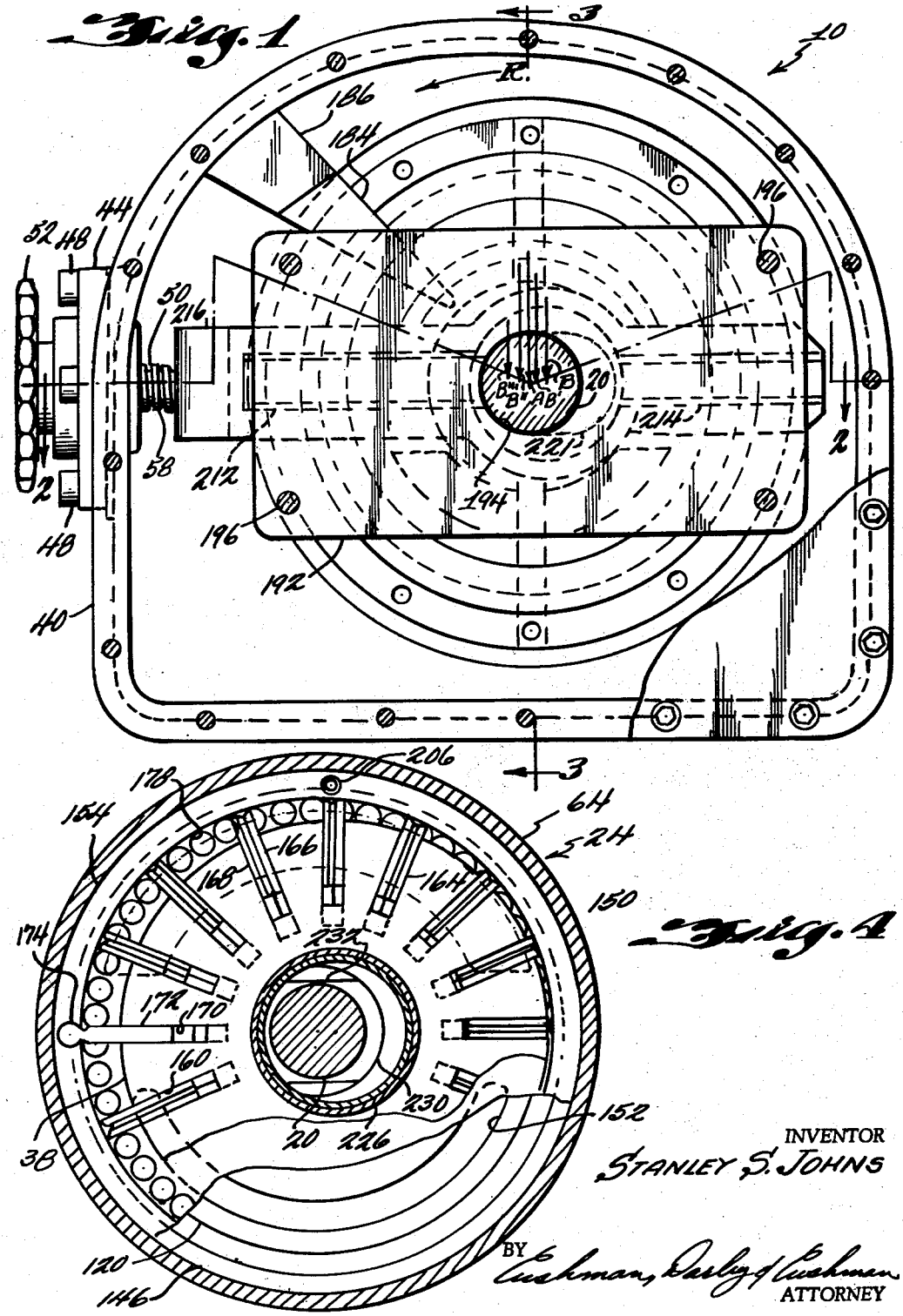

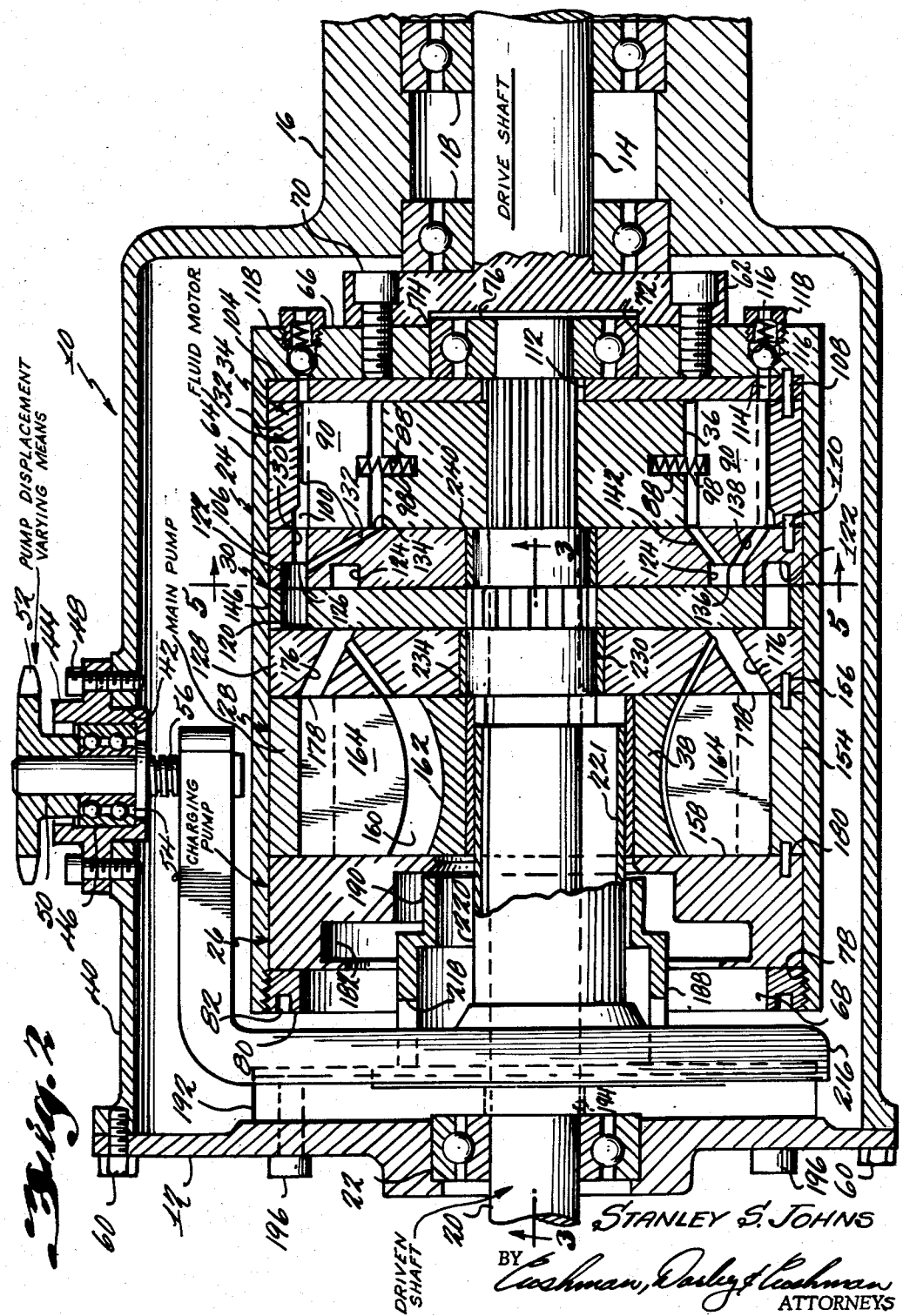

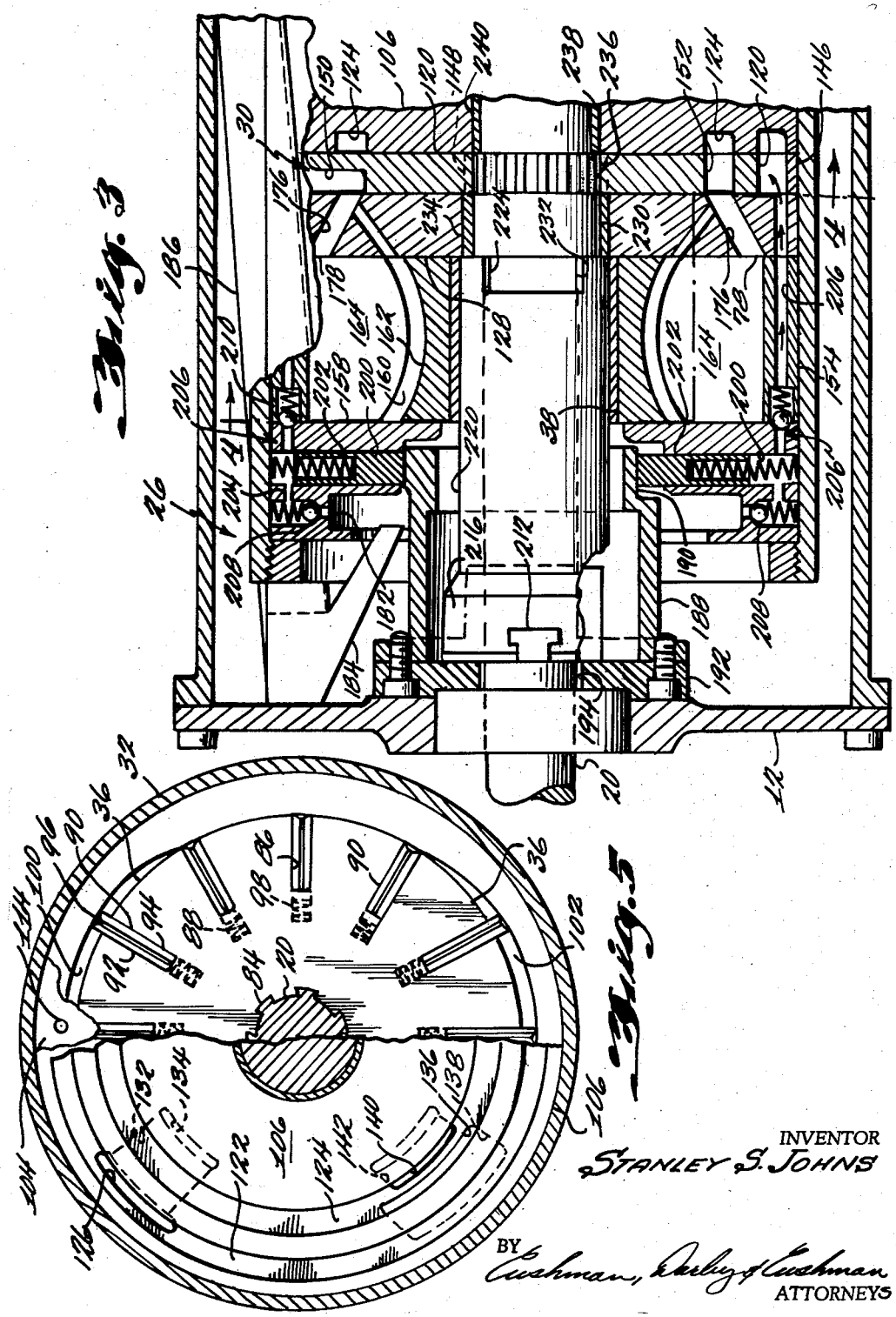

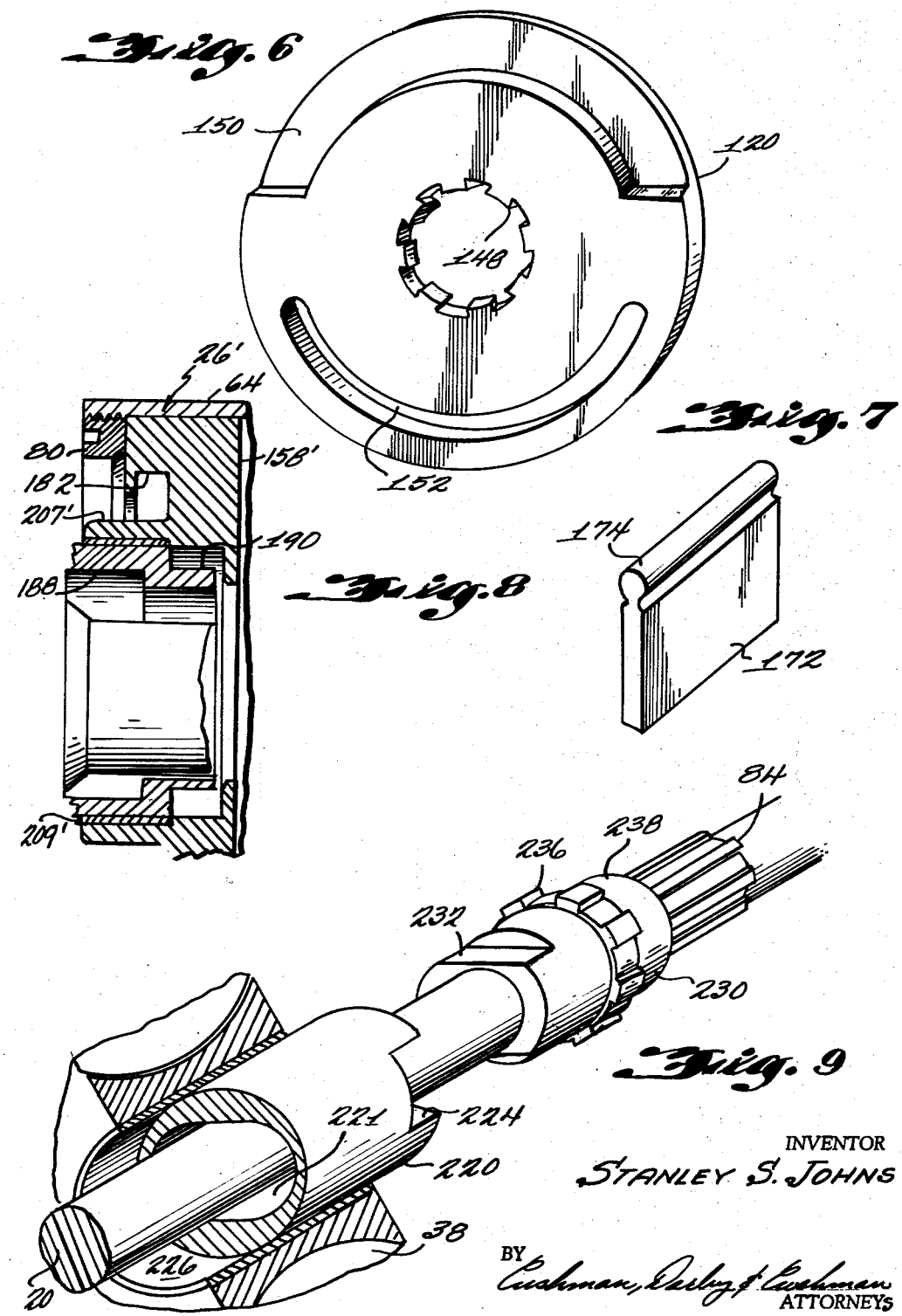

3,190,074
HYDRAULIC TRANSMISSION
Stanley S. Johns, 8 Aintree Road, Towson, Md.
Filed Nov. 22, 1963, Ser. No. 325,699
34 Claims. (Cl. 60—53)

The present invention relates to a change speed transmission mechanism and more particularly to improvements in fluid type transmission mechanisms wherein motion of a drive shaft is transmitted to a driven shaft through the use of hydraulic fluid. While the fluid transmission mechanism of the present invention is particularly adaptable for use in connection with automotive vehicles or the like, it will be understood that the fluid transmission may be used in any application where it is desired to drive a driven shaft from a drive at various power ratios either forwardly or in reverse.

Fluid transmission heretofore utilized for driving a driven shaft from a drive shaft rotated by a prime mover included hydraulic pumps for operating fluid driven motors but by necessity required a number of moving parts and valves as well as a number of interior seals. In many instances the hydraulic fluid, which in most cases is oil, was introduced to the hydraulic circuit through a center shaft of one of the rotating elements of the mechanism necessitating many hydraulic seals and a complicated valving arrangement. Also, such prior transmission mechanisms have had various component parts movable relative to one another with sliding contact between the same which over a period of time caused wear to the parts. The heretofore fluid transmissions, because of their complexity of design, have been large in size in order to obtain the necessary strength in their many parts and by their very complexity of design have been difficult and costly to service.

An important object of the present invention is to provide a fluid transmission having an infinite speed range from overdrive to neutral and to reverse but yet being of simplified and compact construction which reduces maintenance problems and makes servicing easier.

Another object of the present invention is to provide an improved fluid transmission in which a direct drive between the drive shaft and the driven shaft can be effectively accomplished with the entire mechanism revolving as a fluid coupling.

A further object of the present invention is to provide a fluid drive with an improved vane-type pump where there is reduced frictional contact between the vanes and the surface of the pump which the coact.

Still another important object of the present invention is to provide a fluid transmission utilizing a variable volume pump and a reversible constant volume fluid driven motor, the variable volume pump also being capable of adjustment so as to reverse the flow of hydraulic fluid driven therefrom to the fluid driven motor for slowing the speed down and reversing the latter without reversing the rotation of the fluid pump.

A further object of the present invention is to provide an improved vane-type variable volume fluid pump in which the rotor rotates in the same direction as the pump ring but on an axis parallel to and adjustable transversely with respect to the axis of the ring whereby a change in the working position of the pump rotor can cause the flow of hydraulic fluid from the pump to be varied in volume or reversed in direction.

Ancillary to the immediately preceding object, it is a further object of the present invention to provide a fluid pump in which rotation of the vane carrying rotor is caused by coupling the vane carrying rotor to the rotating pump ring.

Still another object of the present invention is to provide an improved fluid transmission wherein precise control can be maintained by adjustment of the position of a single working part through a single control member.

A further object of the present invention is to provide a fluid transmission of the type having a vane-type fluid pump and a vane-type fluid driven motor, the transmission being provided with a charging pump for charging the hydraulic circuitry between the fluid pump and the motor at the outside of the mechanism thereby eliminating complicated fluid passageways through central shafts and sliding mechanisms such as valves in the rotor. By having a charging pump that will supply fluid to the hydraulic circuit at the outside of the mechanism, the fluid mechanism does not require internal shaft seals on the central shaft.

Another object of the present invention is to provide a fluid transmission of the type utilizing a fluid pump and a fluid driven motor, the mechanism including a charging pump for continuously supplying fluid to the hydraulic circuit and the mechanism further including means to release an exclusive supply of fluid to the hydraulic circuitry between the fluid pump and the motor.

Another object of the present invention is to provide a fluid transmission in which the driven shaft extending into the casing of the mechanism is supported in a bearing arrangement so as to eliminate any vibration of the same.

Still another object of the present invention is to provide a simple and compact construction of a fluid transmission which is statically and dynamically balanced.

A further object of the present invention is to provide an improved fluid transmission mechanism which may be easily serviced through one end of the casing without the necessity of removing the casing from its position of use.

A still further object of the present invention is to provide a fluid transmission system having a charging pump rotating with a revolving body member the charging pump being supported within the revolving body by bearing means.

These and other objects and advantages of the present invention will appear more fully in the following specification, claims and drawings in which:

FIGURE 1 is an end elevational view of the fluid transmission of the present invention from the removable cover plate end, a portion of the cover plate being broken away;

FIGURE 2 is a horizontal sectional view through the fluid transmission of the present invention and taken substantially on the line 2—2 of FIGURE 1;

FIGURE 3 is a fragmentary vertical sectional view of the present invention taken substantially on the line 3—3 of FIGURE 1 or 3—3 of FIGURE 2, the view illustrating in detail the relationship of the charging pump with respect to the fluid pump and the valve means between the fluid pump and the fluid driven motor;

FIGURE 4 is a vertical sectional view taken substantially on the line 4—4 of FIGURE 3 and with parts being broken away for purposes of clarity, the view illustrating primarily the novel fluid pump of the present invention;

FIGURE 5 is a vertical sectional view taken on the line 5—5 of FIGURE 2 with parts being broken away for the purposes of clarity, the view illustrating primarily the fluid driven motor of the present invention;

FIGURE 6 is a perspective view of the disc valve element of the valve means between the fluid pump and the fluid driven motor;

FIGURE 7 is an enlarged perspective view of the tongue of the fluid pump for driving the pump rotor simultaneously with the rotation of the pump ring;

FIGURE 8 is an enlarged fragmentary sectional view of a modification of means for interiorly supporting the charging pump end of the revolving body of the present invention; and FIGURE 9 is an exploded fragmentary perspective view of the driven shaft, trunnion shaft, and sleeve member.

Referring now to the drawings wherein like character or reference numerals represent like or similar parts, the fluid transmission of the present invention is best disclosed in FIGURES 1, 2, and 3. Briefly, the fluid transmission of the present invention includes an elongated casing generally designated by the numeral 10 and having an open end covered by a detachable cover plate 12. A drive shaft 14 extends into the casing 10 through a boss 16. A pair of bearings 18 carried by the boss 16 supports the drive shaft 14. The drive shaft 14 is connected to a suitable prime mover such as the engine of an automotive vehicle or the like. A driven shaft 20 extends into the casing 10 through the detachable cover plate 12, the driven shaft 20 being supported in cover plate 12 by means of a bearing 22. A revolvable mechanism generally designated by the number 24 is fixedly supported on the end of the drive shaft 14 for rotation thereby. The revolvable mechanism 24 supports for rotation therein a hydraulic charging pump generally designated by the numeral 26, a fluid pump generally designated by the numeral 28, valve means generally designated by the numeral 30 and a motor ring of a fluid driven motor generally designated by the numeral 34. The fluid driven motor 34 also has a driven rotor 36 which is splined to the driven shaft 20.

At the outset, the operation of the fluid transmission briefly described above is caused by rotation of the drive shaft 14 by a prime mover (not shown). Rotation of the drive shaft 14 in turn causes the revolvable mechanism 24 to rotate therewith which initiates actuation of the hydraulic fluid charging pump 26. At the same time that the pump 26 begins to operate through rotation of the revolvable mechanism 24, the fluid pump 28 also rotates to cause a hydraulic circuit between the same and the motor 34. The fluid pump 28 depending upon the position of its rotor 38 directs high and low pressure hydraulic fluid to the valve means 30 and from there to the fluid driven motor 34. The direction of rotation of the motor rotor 36 is dependent upon the flow of hydraulic fluid from the pump 28 to and through the valve means 30. Rotation of the driven rotor 36 of motor 34 causes the driven shaft 20 to rotate. As will be explained in more detail later in the specification, the position of the pump rotor 38 provides for overdrive, or a variance in forward speed range, or an effective direct coupling of the driven shaft 20 to the drive shaft 14, or reverse speed range wherein the driven shaft is rotated in an opposite direction from the direction of rotation of the drive shaft. Also, the transmission is provided with a neutral position.

Referring now in more detail to the drawings, it will be noted that the elongated casing 10 is provided along one of its side walls 40 with an aperture 42 which is adapted to receive a fitting 44 having a bearing 46 therein. Suitable studs 48 are provided for detachably holding the fitting 44 within the aperture 42. A shaft 50 extending through the bearing 46 is provided on its outer end with a sprocket 52. The shaft 50 is prevented from axial movement relative to the fitting 44 by means of a collar 54 provided on the inner portion thereof and engaging the bearing 46. The portion of the shaft 50 extending into the interior of the casing 10 is threaded as indicated at 56. As will be explained in more detail in the specification, rotation of the shaft 50 by the sprocket 52 provides for the adjustment of the position of the pump rotor 38 so that the speed or power ratio of the transmission may be changed by adjustment of a single working part.

The cover plate 12 of the casing 10 is detachably secured to the casing by means of a plurality of studs 60.

It will be appreciated that when the cover plate 12 is positioned on the casing 10 with the various component parts positioned within the casing, the casing provides a fluid tight sump for the hydraulic fluid necessary to operate the transmission. In this respect, suitable seals may be provided where the drive shaft 14 enters the casing as well as where the driven shaft 20 enters the casing through the cover plate 12.

As mentioned above, the revolving mechanism 24 is fixedly attached to the drive shaft 14. This is accomplished by providing the end of the drive shaft 14 with a flange 62. The revolving mechanism 24 includes a hollow cylindrical body member 64 closed at one end by a wall 66 and open at the other end as indicated at 68. The closed end wall 66 is bolted to the flange 62 on a drive shaft 14 by means of a plurality of studs 70. Also, the end wall 66 is provided with an aperture 72 and has a bearing 74 pressfit therein. The bearing 74 is adapted to receive the free end of the driven shaft 24 so that the free end of the driven shaft is supported thereby for rotation relative to the rotation of the body member 64. By supporting the driven shaft 20 at its end as indicated at 76, and also at the point where it enters the casing through the bearing 22, the driven shaft has the necessary rigidity and stability when rotating at high speeds.

The open end 68 of the hollow cylindrical body member 64 is internally threaded as indicated at 78 and is adpted to receive an annular lock ring 80. The lock ring 80 is provided with spanner holes 82 and is tightened against the various internal working parts within the cylindrical body member 64 to thereby lock the parts in close contact with each other as will be explained later in the specification.

Referring now to FIGURES 2 and 5, it will be noted that the fluid driven motor 34 is positioned within the cylindrical body member 64 adjacent the closed end 66 of the same. The fluid driven motor 34 has its driven rotor 36 provided with internal splines which are received in external splines 84 on the driven shaft 20. Rotor 36 is provided about its periphery with a plurality of radially extending circumferentially spaced slots 86, each of said slots being provided with a short counterbore 88 at its lower end. Each of the slots 86 is provided with a vane 90 comprising a pair of vane elements 92 and 94 having inwardly inclined surfaces 96. The vanes 90 while preferably constructed as a dual vane such as that disclosed in the prior United States Patent 2,393,223 issued March 31, 1949, to Rosen, may be made as a single unit, if so desired. A spring 98 in the counterbore 88 bears against the underneath surface of the vane 90 and urges the vane radially outwardly into contact with the interior surface of the motor ring 32. The interior surface of the annular motor ring 32 is so shaped as to provide diametrically opposite chambers 100 and 102. Side plates 104 and 106 are provided on each side of the ring 32 and rotor 36 of the motor 34. The side plate 104 is fixedly attached to the annular motor ring 32 and to the end 66 of the body member 64 by any suitable means such as a dowel 108. Like wise, side plate 106 is fixedly connected to the annular motor ring 32 by a dowel 110 so that when the drive shaft 14 rotates to cause rotation of the body member 64, the annular ring 32 together with the side plates 104 and 106 rotate as a unit. Side plate 104 is provided with an enlarged center aperture 112 so that the driven shaft 20 can pass therethrough into the bearing 74.

Side plate 104 is provided with a pair of diametrically opposite bores 114 therethrough communicating respectively with the diametrically opposite chambers 100 and 102. The end wall 66 of body member 64 is provided with diametrically opposite passageways 116 therethrough communicating respectively with the bores 114. In each of the passageways 116 there is provided a one way ball check valve 118 which will permit flow of fluid from the chambers 100 and 102 if the pressure of fluid in the chambers exceeds a predetermined amount. The pressure of fluid in the chambers 100 and 102 will exceed a predetermined amount when the charging pump 26 oversupplies the amount of fluid required by the hydraulic circuit of the revolving mechanism 24 and this excessive supply of hydraulic fluid can then be relieved from within the mechanism to the exterior thereof through the ball check valves 118. In other words, when the variable volume fluid pump 28 demands only a small amount of fluid, the constant volume of fluid received by the valve means 30 from the charging pump 26 is transferred through the motor 34 and discharge from the circuit through valves 118.

Valve means 30 includes a disc valve element 120, FIGURES 2, 3 and 6, as well as a side plate 128 for the fluid pump 28 and the side plate 106 of the motor 34. The disc valve element, as will be explained later in the specification, is so mounted that it does not rotate with the revolving mechanism 24 or with the driven shaft 20 but is stationary with respect to the casing 10.

Referring now to FIGURES 2, 3, and 5, it will be noted that the side plate 106 on its face abutting the stationary disc valve element 120 is provided with a pair of radially spaced annular grooves 122 and 124. The groove 122 is provided with a pair of diametrically opposite ports 126 (one being shown in FIGURE 5), the ports communicating respectively by fluid passageways 130 (one being shown in FIGURE 2) with the diametrically opposite chambers 100 and 102. Additionally, passageways 132 opening to the grooves 122 adjacent each of the ports 126 extend to and open at the innermost portion of the slots 86 of rotor 36 as indicated at 134 so as to provide for balancing of hydraulic pressures on the vanes 90.

The inner groove 124 of the side plate 106 is provided with a pair of diametrically opposite ports 136 (one being shown in FIGURE 5), each of the ports 136 communicating with a fluid passageway 138. Each of the passageways 138 respectively open to the diametrically opposite chambers 100 and 102 of fluid driven motor 34. Additionally, the groove 124 has a pair of diametrically opposite ports 140 communicating with a passageway 142 leading to and opening at the innermost portion of slots 86 of motor rotor 36. The purpose of the passageways 142 is identical to that of passageways 132 in that they provide for balancing of hydraulic pressures on the vanes 90 carried in the slots 86.

It will now be appreciated that each of the chambers 100 and 102 is provided at one end thereof with an opening to the groove 122 and at the other end thereof with an opening to the groove 124 so that there can be a flow of hydraulic fluid into the chambers of the motor at one end of the chamber and then out of the chamber at the other end. The direction of flow of hydraulic fluid from the fluid pump 28 to the motor 34 coupled with the volume of this flow controls the speed ratio of and the direction of rotation of the driven shaft 20. The grooves 122 and 124 supply fluid to and receive fluid from the motor 36 and vice versa depending on the position of pump rotor 38.

An annular spacer element 146 separates the side plate 106 of fluid motor 34 from the side plate 128 of the fluid pump 28 by a sufficient distance to permit the side plates 106 and 128 to rotate with a sliding fit relative to the disc valve element 120 therebetween. As clearly shown in FIGURE 2, the disc valve element 120 is of considerably less diameter than the diameter of the annular spacer 146, its periphery being flush with the inner edge of the groove 122. Disc valve element 120, as shown in FIGURE 6, is provided with an inner spline 148 for mounting the same in a fixed relationship with respect to the casing so that it is stationary while pump 28 and motor 34 rotate, as will be described later in the specification.

Referring now to FIGURES 3 and 6, the disc valve element 120 is provided with an outer arcuate channel 150 along a portion of its periphery and an inner arcuate channel 152. The inner channel 152 extends completely through the disc valve element 20 and is so positioned thereon that it will be adjacent the annular groove 124. On the other hand, the arcuate channel 150 is formed on the face of the disc valve element 120 opposite to the face adjacent the side plate 106, the channel 150 being positioned so that it can cooperate with passageways 176 (to be described later) in the side plate 128 just as the inner channel 152 also can cooperate with the passageways 176.

Fluid pump 28 for supplying fluid to the motor 34 to drive its rotor 36 in one direction or the other includes an annular pump ring 154 fixed to the side plate 128 by a dowel 156, and to the side plate formed by the charging pump 26. In this respect, the charging pump 26 is provided with an annular body member 158 having a flat surface cooperating with the fluid pump 28. The rotor 38 of fluid pump 28 is provided with a plurality of substantially radially extending slots 160 curved at their inner end as indicated at 162, each of the slots having a vane 164 slidably mounted therein. The vanes 164, which have a complementary curve to the curve 162 in slots 160, are preferably of the dual vane type including the elements 166 and 168, just as the vanes 90 of fluid motor 34. However, it is not necessary for the vanes 164 to be normally urged in an outwardly direction as both the rotor 38 and the annular pump ring 154 rotate simultaneously as a unit thus causing the vanes to move outwardly into engagement with the inner surface of the annular pump ring 154 by centrifugal force. As will be explained in more detail in the specification, the axis rotation of the rotor can be adjusted transversely with respect to the axis of rotation of the annular ring 28 so as to get various speed ratios and also provide for reverse drive.

Since the ring 154 is carried by and rotates with the body member 64, it is used to rotate the pump rotor 38. In more detail, the pump rotor 38 is provided with a slot 170 and a tongue element 172 pivotally attached to the annular ring 154 is slidable therein. The tongue element 172 is provided with a head portion 174 and is pivotable to a slight degree in a groove provided in a ring 154, the pivotal axis of the tongue element 172 being parallel to the axis of rotation of the annular ring 154 and the pump rotor 38. By having the pump rotor driven from the pump ring with the rotor axis adjustably offset with respect to the axis of the ring, there is minimum wear on the ends of the vanes 164 as there is slight relative rotative movement between these elements.

Referring back to the side plate 128, it will be noted that the plate 128 is provided with a plurality of circumferentially spaced passageways 176 openings in ports 178 to the interior of the annular pump ring 154. The other ends of the pasageways 176 open to the face of the disc value element 120 having the outer channel 150 and inner channel 152. It will now be understood, depending upon the position of the axis of rotation of the pump rotors 38 with respect to the axis of rotation of the pump ring 154, hydraulic fluid will be flowing through some of the passageways 176 communicating to one of the outer or inner channels 150 to 152 from the chamber between the pump rotor and the pump ring whereas in other of the passageways 176 fluid will be flowing in an opposite direction from the other of the outer and inner channels to the chamber between the pump rotor and pump ring. As mentioned above, the charging pump 26 provides a side plate for the fluid pump 28. The annular member 158 of the pump is provided with a hydraulic fluid collecting groove 182 which is open to the interior of the casing at 184. Hydraulic fluid is supplied to the fluid collecting groove 182 by means of a spout 184 connected to a fluid through 186. When hydraulic fluid is slung by centrifugal force against the casing due to the rotation of the revolving mechanism 24, it is collected in the chute 186 and flows by gravity down the chute to the spout 184 and drops onto the fluid collecting groove. Of course, the rotation of the annular member 158 retains the fluid in the groove 182 by centrifugal force until such time it is withdrawn therefrom by the pump mechanism of the charging pump 26 and pumped thereby to disc valve element 120.

In more detail, a flanged support member 188 has on its outer end an eccentric cam 190 for actuating the charging pump 26. The flanged support member 188 is attached to a support plate 192 having an aperture 194 therein through which the driven shaft 20 extends. The support plate 192 is carried on the inside of the cover plate 12 by means of studs 196. Annular member 158 is provided with a pair of diametrically opposite bores 200 extending radially thereof and each having a hollow piston 202 therein. A spring 204 positioned between each of the pistons 202 and the outer wall of a cylindrical body member 64 normally urge the pistons 200 radially inwardly into engagement with the cam. A passageway generally designated by the numeral 206 extends from the hydraulic fluid collecting groove 182 to and through the portion of bore 200 which defines the piston chamber and then through the annular pump ring 154 and pump side plate 120 to the space between the outer periphery of the disc valve element 120 and the inner periphery of the annular spacer ring 146. There is one passageway for each bore 200. In each passageway 206 there is provided a pair of spring pressed ball type check valves 208 and 210, one of the valves being on the inlet side to the bore 200 and the other being on the outlet side from the bore 200. Both valves operate in the same direction so that hydraulic fluid can only flow in one direction through the passageway 206 from the fluid collecting groove 182 to the valve means 30. The cylindrical body member 64 causes rotation of the annular member 158 and thus the pistons 202 follow the contour of the stationary cam 190. When one of the pistons 202 is moving radially inwardly, the valve 210 will be closed while the valve 208 is open, thus, permitting hydraulic fluid to flow from the groove 182 into the piston chamber to charge the same. When one of the pistons 202 moves in a radially outwardly direction, the valve 208 will close and the pressure applied to the hydraulic fluid by the piston causes the valve 210 to open so that there is flow to the valve means 30 where it is supplied to the hydraulic circuit of the fluid pump 28 and the motor 34.

The support plate 192 is provided with a pair of spaced but aligned T-shaped projections 212 and 214 which are adapted to receive a grooved L-shaped support member 216. The support member 216 has one leg thereof internally threaded to receive the threaded end 56 of shaft 50. It will be appreciated that the member 188 is provided with suitable cutouts 218 therein so that it straddles the support member 216 and thus does not interfere with its rectilinear motion caused by rotation of the sprocket 52. A trunnion shaft 220 is fixedly connected to the support member 216 either integrally or by studs or the like, the shaft having an elongated bore 221 therethrough that clears the driven shaft 20 and permits the trunnion shaft to be shifted relative of the driven shaft. The hollow trunnion shaft 220 is slotted at its outer end as indicated at 224 and, additionally, rotatably receives a sleeve-type bushing or bearing 226 pressed into the fluid pump rotor 38. Since the trunnion shaft does not rotate, it provides a means for operatively supporting the disc valve element 120 in a fixed position with respect to the casing. In more detail, a sleeve member 230 having a flattened end 232 fits into the slotted end 224 of the trunnion shaft 220 giving sliding movement with respect thereto. The sleeve member 230 rotatably receives a bushing or bearing 234 pressed into the side plate 128. It is also splined externally, as indicated at 236, to receive the splines 148 of the disc valve element 120. A portion of the sleeve element extending through the motor side plate 106 is of reduced external diameter as indicated at 238 and is adapted to rotatably receive a bushing or bearing 240 pressed into the side plate 106. The inner diameter of the sleeve element 230 is sufficient to permit the drive shaft 220 to extend therethrough and rotate with respect thereto.

Referring now to FIGURE 7, there is disclosed a modification of the charging pump 26 wherein it is not only supported by the cylindrical body member 64 and the lock ring 80, but it is also supported internally on a bearing in order to give it more rigidity. In more detail, the annular member 158' of the charging pump 26' is provided with an axially extending collar 207' which extends over the flanged support member 188. A bushing 209' fits between the collar 207' and the outer surface of the flanged support member 188. By providing a bearing between the annular member 158' and the flanged support member 188 which is operatively fixed to the casing cover plate 12, the charging pump 26 is more sturdily supported and thus the various units of the revolvable mechanism 24 are most positively held in place and are not susceptible to side play.

The operation of the fluid transmission of the present invention may be briefly described as follows. At the outset it will be appreciated that the position of the axis of rotation of the pump rotor 38 relative to the rotating center of the revolvable mechanism 24 or in more detail to the axis of rotation of the pump ring 154 controls the driving action of the transmission. In other words, the position of the pump rotor controls the volume of fluid flow and the direction of fluid flow from the fluid pump 28 to the fluid driven motor 34.

Referring to FIGURE 1 the axis or rotation of the revolvable mechanism 24 is indicated by the arrow A whereas the axis of rotation of rotor 38 of fluid pump 28 is indicated by the arrow B. In this position, the transmission would be operating to drive the driven shaft 20 in overdrive assuming the revolvable mechanism is rotating in the direction of the arrow R. In this position there is maximum forward pumping action causing high overspeed of the driven shaft 20. If the support member 216 is moved to the left so that the axis of rotation of the rotor 38 moves to the position indicated by the arrow B', then the forward pumping action of pump 28 is reduced and a normal operating speed range is obtained. If the support member 216 is moved further to the left of FIGURE 1, the axis of rotation of rotor 38 coincides with the axis of rotation of the revolvable mechanism 24 and more particularly coincides with the axis of the pump ring 154 carried thereby. Because of the central position of the pump rotor 38, it will be evident that all of the ports 178 of passageways 176 will be coaxially aligned with the chamber between the pump rotor 38 and the ring 154 and thus there can be no flow of fluid through the passageways 176 to or from the valve element 120. Consequently, the rotation of the revolving mechanism 24 will have no relative movement of internal parts and there will be a fluid lock in the fluid motor 34 between its ring 32 and rotor 36 and thus a direct drive from the drive shaft 14 to the driven shaft 20 is obtained. When the axis of rotation of the pump rotor 38 moves to the left of the axis of rotation A, the flow of hydraulic fluid from the pump 28 will be reversed to that which it was when the axis was in the position B and B'. This will result in an infinite low gear of forward rotation of shaft 20. Additional movement of the axis of the rotor 38 to the left of the position B'' will produce a neutral position as the pump volume will balance the motor displacement to thereby cause the motor rotor to stop. In other words, it will be understood that forward flow from the pump will cause overspeed of the driven shaft and a reverse flow from the pump will impart an underspeed to the driven shaft. When reverse flow balances the drive motor displacement, the driven shaft is stopped. When reverse flow exceeds the drive motor displacement, the driven shaft reverses direction. This occurs when the axis of the rotor 38 is moved to the extreme left position as indicated by the arrow B'''.

The objects and advantages of this invention have been fully and effectively accomplished by the mechanism described above and disclosed in the drawings, but it will be appreciated that various modifications may be made to the invention without departing from the scope and spirit of the invention. Therefore, the terminology used in this specification is for the purposes of description and not limitation, the scope of the invention being defined in the appended claims.

What is claimed is:

1. A fluid transmission comprising: a casing; a drive shaft extending into said casing; a driven shaft coaxially aligned with said drive shaft and extending into said casing; a hollow cylindrical body member in said casing concentric with said driven shaft and having a closed end, said body member being supported on the end of said drive shaft for rotation therewith; a vane-type variable volume fluid pump carried within said body member, said fluid pump including an annular pump ring supported by said body member for rotation therewith, a rotor having vanes mounted in slots therein extending therefrom and cooperating with the interior surface of said pump ring, said rotor having an axis parallel to and shiftable transversely with respect to said pump ring, and means connecting said pump ring with said pump rotor for rotating said pump rotor simultaneously with the rotation of said pump ring; a reversible vane-type constant volume fluid driven motor carried within said body member, said fluid driven motor including an annular motor ring rotated with and carried by said body member and a motor rotor having vanes mounted in slots therein and extending therefrom for cooperating with the inner surface of said motor ring, said motor rotor being fixedly attached to said driven shaft; and valve means interposed between said pump and said motor for controlling flow fluid to said motor dependent upon position of the axis of rotation of said pump rotor with respect to the axis of rotation of said pump ring.

2. A fluid transmission as claimed in claim 1 wherein said means connecting said pump ring with said pump rotor includes a tongue fixedly connected to said pump ring and extending into a slot in said pump rotor.

3. A fluid transmission as claimed in claim 2 wherein said tongue includes a root portion pivotally connected to said pump ring on an axis parallel to the axis of the pump ring.

4. A fluid transmission as claimed in claim 1 including a bearing in said casing for supporting one portion of said driven shaft and a bearing in the closed end of said body member for supporting the end of said driven shaft.

5. A fluid transmission as claimed in claim 1 wherein said valve means interposed between said pump and said motor includes a disc valve and means to maintain said disc valve stationary with respect to said casing.

6. A fluid transmission as claimed in claim 1 including means to adjustably shift said pump rotor transversely with respect to said pump ring, said means including a hollow trunnion shaft for rotatably supporting said pump rotor, a support member fixedly supporting said trunnion shaft, tongue and groove means between said support member and said casing for adjustably sliding said support member and said trunnion shaft transversely of the axis of said pump ring, and means for moving said support member.

7. A fluid transmission as claimed in claim 6 wherein said means for moving said support member includes an adjusting screw threadably received in said support member and a sprocket fixed to said screw for rotating the same, said sprocket being carried by said casing.

8. A fluid transmission as claimed in claim 6 wherein said valve means includes a disc valve operatively supported by said trunnion shaft whereby said disc valve is stationary with respect to said casing.

9. A fluid transmission as claimed in claim 1 including a charging pump carried within said body member, said charging pump including means to supply fluid under pressure to said valve means for circulation through said pump and said motor.

10. A fluid transmission as claimed in claim 9 wherein said charging pump includes a ring-shaped member carried by said body member and having at least one radially extending bore, a piston element movable in said bore and having one end thereof extending from said bore inwardly of said ring-shaped element, a cam fixed to said casing and engaging the inner end of said piston element, spring means normally urging said piston element into engagement with said cam, said ring-shaped element having a fluid collecting ring and fluid passageway therethrough, the fluid passageway extending to and through said bore to said valve means whereby movement of said piston element causes fluid to be pumped from said collecting ring to said valve means.

11. A fluid transmission as claimed in claim 9 including means cooperating with said charging pump to compensate for an over-supply of fluid to said valve means.

12. A fluid transmission as claimed in claim 1 including spring means between said motor vanes and said motor rotor for normally urging said motor vanes into contact with said motor ring.

13. A fluid transmission comprising: a casing; a drive shaft extending into said casing; a hollow cylindrical body member having a closed end, said drive shaft being fixedly attached to the closed end of said body member for rotatably supporting the same within said casing; bearing means supported in the closed end of said body member; a driven shaft extending into said casing and into the open end of the cylindrical body member, said driven shaft having its end within said cylindrical body member supported by the bearing in the closed end of said body member; a bearing in said casing for supporting said driven shaft at a point in spaced relationship to the bearing supporting the end of said driven shaft; a variable volume fluid pump carried within said body member; a reversible constant volume fluid driven motor positioned within said body member and having a driven rotor keyed to said driven shaft; valve means interposed between said pump and said motor for providing a continuous fluid circuit to and from said pump and motor; and an end plate for retaining said pump, valve means, and motor within said body member.

14. A fluid transmission as claimed in claim 13 in which said variable volume fluid pump includes an annular pump ring rotatably supported by said body member and a pump rotor having slots therein with vanes in said slots cooperating with said annular pump ring, said pump rotor having an axis of rotation parallel to and shiftable with respect to the axis of said annular pump ring and means for driving said rotor from said annular pump ring.

15. A fluid transmission as claimed in claim 14 wherein said means for driving said rotor includes a tongue element pivotally carried by a pump ring, said tongue element having a pivotable axis parallel to the axis of said pump ring, and said pump rotor having a slot therein for receiving said tongue element.

16. A fluid transmission as claimed in claim 14 in which said fluid driven motor includes an annular motor ring carried by said body member and having cutout portions on its inner surface diametrically opposed to each other to define a pair of chambers, said motor rotor having slots therein and vanes in said slots, said vanes being spring urged outwardly; and in which said valve means includes a side plate carried by said body member and positioned adjacent said pump and having a plurality of circumferentially spaced passageways therethrough communicating at one end with said pump, a disc valve element operatively supported by said casing and positioned adjacent said pump side plate, said disc valve having an arcuate outer channel and an arcuate inner channel oppositely disposed from the outer channel, both of said outer and inner channels communicating with the passageways in said side plate, and a side plate carried by said body member and positioned between said motor and disc valve element, said last-mentioned side plate having a first annular groove communicating with the outer channel in said disc valve element and a second annular groove communicating with the inside channel of said disc valve element, each of said grooves having a pair of diametrically opposite ports opening respectively to the diametrically opposite chambers of said motor.

17. A fluid transmission as claimed in claim 16 including a sprocket rotatably carried by said casing, said sprocket having a shaft extending into said casing threaded on its inner end, a support member threadably receiving the shaft of said sprocket, guide means for moving said support member in a rectilinear direction with respect to said casing, and a hollow trunnion shaft carried by said support member and surrounding said driven shaft, said trunnion member rotatably receiving said pump rotor thereon.

18. A fluid transmission as claimed in claim 17 in which said trunnion shaft is provided with a slotted end, aa sleeve member on said driven shaft having a flattened end portion received in the slotted end of said trunnion shaft, said sleeve member being splined to receive said disc valve element to hold the same stationary with respect to said casing.

19. A fluid transmission comprising: an elongated casing having a detachable end cover plate, a rotatable drive shaft extending into said casing opposite the end of the casing having the cover plate; a hollow cylindrical body member having a closed end attached to the end of the drive shaft within said casing; a fluid driven motor carried within said cylindrical body member adjacent the closed end thereof and having a driven rotor; a rotatable driven shaft extending through said cover plate into said cylindrical body member, said driven shaft having its end rotatably supported in the closed end of said cylindrical body member and having said motor rotor keyed thereto; a variable volume fluid pump carried by said body member and operable by rotation of the same; valve means interposed between said fluid pump and said fluid driven motor for circulating high and low pressure hydraulic fluid between the pump and motor; a charging pump carried within said body member adjacent its open end for charging said valve means with fluid for said pump and motor; and means to retain said charging pump, said fluid pump, said valve means and said motor within said cylindrical body member.

20. A fluid transmission as claimed in claim 19 in which said charging pump includes an annular member supported within and rotatable with said cylindrical body member, said annular member having a hydraulic fluid collecting groove open to the interior of said casing, said annular member further having at least a pair of oppositely disposed bores extending therethrough in a generally radial direction, a hollow piston carried in each of said bores, spring means urging said pistons inwardly, and cam means operatively connected to and supported by said casing for engaging the inner end of said pistons, said annular member having a passageway opening to said hydraulic fluid collecting groove and extending through said bore and to said valve means, said passageway having check valve means on each side of said bore whereby fluid can flow in one direction from said hydraulic fluid collecting grooves to said valve means.

21. A fluid transmission as claimed in claim 20 including a collar on said annular member, a trunnion operatively connected to said casing, and a bearing between said trunnion and the collar on said annular member.

22. A fluid transmission as claimed in claim 20 including valve means in the end wall of said cylindrical body member, said valve means providing for release of excessive supply of fluid to said motor.

23. A fluid transmission as claimed in claim 22 wherein said valve means includes a one way check valve in a passageway provided in the closed end of said body member between said motor and the interior of said casing.

24. A fluid transmission as claimed in claim 19 including means to release an excessive supply of fluid to said motor by said fluid pump and said charging pump.

25. A fluid transmission of the type having a fluid pump, valve means, and fluid driven motor encased in a rotating body member carried within a stationary casing for driving a driven shaft from a drive shaft, the improvement in a charging pump for supplying hydraulic fluid to the hydraulic system of the transmission by flowing hydraulic fluid to the valve means externally of the drive and driven shafts comprising: an annular member carried within and rotatable with the body member, said annular member having a hydraulic fluid receiving channel open to the interior of the casing, said annular member having at least one radially extending bore therein opening on its interior surface, a piston carried in said bore, spring means normally urging said piston radially inwardly of said member, cam means operatively carried by the casing for engaging the inner end of said piston for reciprocating the same in said bore, said body member having a passage open to the hydraulic fluid collecting channel and extending through said bore to the valve means, and one way check valves positioned in said passageway on each side of said bore whereby hydraulic fluid can flow in one direction only through said passage.

26. A fluid transmission as claimed in claim 25 wherein said annular member is provided with an axially extending collar, and wherein the casing includes a trunnion, a bearing between said trunnion and said collar for rotatably supporting said annular member relative to said cam means.

27. A vane-type fluid pump for circulating fluid in a hydraulic circuit in either direction comprising: an annular pump ring having sidewalls on each side thereof; a rotor positioned within said ring and having a smaller diameter than the inside diameter of said ring, said rotor having slots therein, each of said slots having a vane extending therefrom for cooperating with the interior surface of said annular ring; said rotor having an axis of rotation parallel to and shiftable with respect to the axis of rotation of said annular ring; at least one of said side walls having a plurality of circumferentially spaced hydrauilc fluid passageways communicating with the area between said rotor and the interior surface of said ring; means to rotate said annular ring; and means connecting said annular ring with said rotor whereby said rotor is rotated on its axis when said ring is rotated on its axis.

28. A vane type fluid pump as claimed in claim 27 in which said means connecting said annular ring with said rotor includes a tongue element operatively connected to one of said ring and said rotor and the other of said ring and said rotor having a slot for slidably receiving said tongue element.

29. A vane type fluid pump as claimed in claim 27 in which said means connecting said annular ring with said rotor includes a tongue element pivotally connected to said ring element on an axis parallel to said ring, said rotor having a slot therein for slidably receiving the free end of said tongue.

30. A vane type fluid pump as claimed in claim 27 including means to shift the axis of rotation of said rotor transversely of the axis of rotation of said ring while maintaining the axis of rotation of the rotor parallel to the axis of rotation of the ring, said last-mentioned means including a trunnion shaft on which said rotor rotates, said trunnion shaft being carried by a support member movable in a rectilinear path.

31. A vane type fluid pump as claimed in claim 27 in which the side wall having the circumferentially spaced hydraulic fluid passageways also includes a fluid passageway communicating with the inner end of each of the slots in the rotor and with at least one of the hydraulic fluid passageways whereby pressure of hydraulic fluid is balanced against the vanes.

32. In a fluid transmission of the type having a variable volume fluid pump, a reversible constant volume fluid driven motor for driving a driven shaft and means for providing a continuous fluid circuit to and from the pump and motor, the improvement in the reversible constant volume fluid driven motor comprising: a rotating casing including an annular motor ring having side plates carried thereby, said annular motor ring having cutout portions on its inner surfaces diametrically opposite to each other to define a pair of diametrically opposite chambers; a driven motor rotor carried within said casing and keyed to the driven shaft, said motor rotor having slots therein and vanes in said slots for cooperating with the interior of said annular ring and the said pair of chambers therein; and means for flowing fluid simultaneously into each of said chambers and simultaneously out of each of said chambers while said casing is rotating to thereby cause said motor rotor to rotate.

33. A fluid transmission as claimed in claim 32 including spring means in each of said slots of said motor rotor for urging the vanes therein outwardly into engagement with the interior of the annular motor ring.

34. A fluid transmission as claimed in claim 32 in which said last-mentioned means includes a first pair of diametrically opposite ports opening to the respective diametrically opposite chambers of said motor and a second pair of diametrically opposite ports opening respectively to the diametrically opposite chambers of said motor, said first and second pairs of ports acting respectively as inlet and outlet ports for fluid being pumped to and from the pump.

References Cited by the Examiner
UNITED STATES PATENTS

| | | | |
|---|---|---|---|
| 2,687,012 | 8/54 | Glenn | 60—53 |
| 2,927,430 | 3/60 | Castles | 60—53 |

JULIUS E. WEST, *Primary Examiner.*